(12) United States Patent
Bell et al.

(10) Patent No.: US 9,684,562 B2
(45) Date of Patent: Jun. 20, 2017

(54) AUTOMATIC SERIAL STARTING OF RESOURCE GROUPS ON FAILOVER BASED ON THE PREDICTION OF AGGREGATE RESOURCE USAGE

(71) Applicant: International Business Machines Corporation, Armonk, NY (US)

(72) Inventors: Dionysius D. Bell, Round Rock, TX (US); Li Li, Cedar Park, TX (US); Hari H. Madduri, Austin, TX (US); Ryan D. McNair, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/804,803

(22) Filed: Jul. 21, 2015

(65) Prior Publication Data

US 2017/0024293 A1    Jan. 26, 2017

(51) Int. Cl.
*G06F 11/20* (2006.01)
*G06F 11/14* (2006.01)
(Continued)

(52) U.S. Cl.
CPC ........ *G06F 11/1438* (2013.01); *G06F 9/4881* (2013.01); *G06F 11/203* (2013.01); *G06F 11/3003* (2013.01); *G06F 11/3495* (2013.01); *G06F 9/5044* (2013.01); *G06F 9/5077* (2013.01); *G06F 11/2028* (2013.01); *G06F 11/3466* (2013.01); *G06F 2201/805* (2013.01);
(Continued)

(58) Field of Classification Search
None
See application file for complete search history.

(56) References Cited

U.S. PATENT DOCUMENTS 6,922,791 B2    7/2005  Mashayekhi et al.
7,444,335 B1 *  10/2008  Colrain ................ G06F 11/203
                                                          707/687
(Continued)

OTHER PUBLICATIONS

Jas et al, Dijkstra's shortest path algorithm serial and parallel execution performance analysis, May 2012, MIPRO 2012, pp. 1811-1815.*
(Continued)

*Primary Examiner* — Abu Ghaffari
(74) *Attorney, Agent, or Firm* — Mark G. Edwards (57) ABSTRACT

A method for automatically prioritizing startup of resource groups during a migration event. The method may include monitoring resource usage of a first and a second set of applications associated, respectively, with a first and a second resource group executing on a first computing node. The method may additionally include generating respective first and second resource usage models for the first and second resource groups based on resource usage. The method may then include extrapolating, based on the first and second resource usage models, respective first and second resource group usage scores for the first and second resource groups at a second time in response to a migration event, the second time occurring subsequent to the first time. The method may further include determining, based on the extrapolating, a priority order for serially starting the first and second set of applications on a second computing node at the second time.

10 Claims, 4 Drawing Sheets

(51) Int. Cl.
G06F 11/30 (2006.01)
G06F 11/34 (2006.01)
G06F 9/48 (2006.01)
G06F 9/50 (2006.01)

(52) U.S. Cl.
CPC .... *G06F 2201/85* (2013.01); *G06F 2201/865* (2013.01)

(56) References Cited

U.S. PATENT DOCUMENTS

| | | | |
|---|---|---|---|
| 7,665,090 B1 | 2/2010 | Tormasov et al. | |
| 7,757,214 B1 | 7/2010 | Palczak et al. | |
| 8,201,180 B2 | 6/2012 | Briscoe et al. | |
| 8,429,450 B2 | 4/2013 | Brown et al. | |
| 8,813,085 B2* | 8/2014 | Glew | G06F 9/4881 718/103 |
| 9,122,538 B2* | 9/2015 | Box | G06F 9/5077 |
| 9,250,974 B1* | 2/2016 | Estes | G06F 9/5072 |
| 2002/0166117 A1* | 11/2002 | Abrams | G06Q 20/145 717/177 |
| 2004/0148152 A1* | 7/2004 | Horikawa | G06F 11/3447 703/22 |
| 2006/0080568 A1* | 4/2006 | Subbaraman | G06F 11/2023 714/47.3 |
| 2006/0190760 A1 | 8/2006 | Saika | |
| 2008/0052719 A1 | 2/2008 | Briscoe et al. | |
| 2010/0082321 A1* | 4/2010 | Cherkasova | G06F 11/3447 703/22 |
| 2010/0083248 A1* | 4/2010 | Wood | G06F 9/5077 718/1 |
| 2011/0004682 A1* | 1/2011 | Honnold | G06Q 30/02 709/224 |
| 2011/0087469 A1* | 4/2011 | Kumar | G06F 11/3447 703/2 |
| 2011/0295999 A1* | 12/2011 | Ferris | G06F 9/5072 709/224 |
| 2013/0080641 A1* | 3/2013 | Lui | H04L 67/10 709/226 |
| 2013/0185433 A1* | 7/2013 | Zhu | H04L 67/303 709/226 |
| 2013/0262915 A1 | 10/2013 | Frank et al. | |
| 2014/0013153 A1 | 1/2014 | Chittigala et al. | |
| 2015/0135185 A1* | 5/2015 | Sirota | G06F 9/5061 718/103 |

OTHER PUBLICATIONS

Haya et al, Multi-Application Resource Allocation with Users Discrimination in Cellular Networks, 2014, IEEE, 25th International Symposium on Personal, Indoor and Mobile Radio Communication, pp. 1163-1168.*

Stok et al, Projecting Disk Usage Based on Historical Trends in a Cloud Environment, 2012, ACM, ScienceCloud'12, pp. 63-70.*

IP.com, Resource Usage Conflict Management Orchestrator, 2013, IP.com, pp. 1-5.*

Bell et al., "Automatic Serial Starting of Resource Groups on Failover", U.S. Appl. No. 14/851,150, filed Sep. 11, 2015.

List of IBM Patents or Patent Applications Treated as Related, dated Sep. 9, 2015, pp. 1-2.

* cited by examiner

AUTOMATIC SERIAL STARTING OF RESOURCE GROUPS ON FAILOVER BASED ON THE PREDICTION OF AGGREGATE RESOURCE USAGE

BACKGROUND

The present disclosure relates to cluster computing systems, and more specifically, to an architecture for automatically prioritizing startup of resource groups during a migration event on failover clusters.

Failover clusters may have two or more computing nodes to provide services. One or more of computing nodes may be configured to take over processing of application workloads when system resources providing services to applications within the computing environment fail. One service provided by failover clusters is high availability of cluster resources (e.g., resource groups). High availability of cluster resources refers to the ability of a failover cluster to reliably make cluster resources available during a given period of time. Failover clusters may include a high availability controller which enables high availability of cluster resources by detecting when conditions in the cluster change, and migrating resource groups to standby nodes in response to the changed conditions. Migrating the resource groups to a standby node may include configuring the resources required for the resource group on the standby node and starting the applications of the resource groups on the standby node.

SUMMARY

According to embodiments of the present disclosure, a method for automatically prioritizing startup of resource groups during a migration event on failover clusters may include monitoring resource usage of a first set of applications associated with a first resource group of a set of at least two resource groups executing on a first computing node at a first time. Each resource group of the set of at least two resource groups may include one or more associated applications that utilize resources of a first computing node. The method may additionally include monitoring resource usage of a second set of applications associated with a second resource group of the set of at least two resource groups executing on the first computing node at a first time. Respective first and second resource usage models for the first and second resource groups may then be generated based on resource usage. The method may then include extrapolating, based on the first and second resource usage models, respective first and second resource group usage scores for the first and second resource groups at a second time in response to a migration event, the second time occurring subsequent to the first time. The method may further include determining, based on the extrapolating, a priority order for serially starting the first and second set of applications on a second computing node at the second time.

Other embodiments are directed to a system and a computer program product.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to cluster computing systems, more particular aspects relate to an architecture for automatically prioritizing startup of resource groups during a migration event on failover clusters. While the present disclosure is not necessarily limited to such applications, various aspects of the disclosure may be appreciated through a discussion of various examples using this context.

Embodiments of the present disclosure are directed towards providing high availability of cluster resources on failover clusters according to a resource group application priority. Failover clusters are clusters of computing nodes, where a standby node has or acquires spare capacity to failover if and when a node goes down. Failover clusters may provide high availability based on resource group priorities by having redundant nodes (e.g., standby nodes) available to provide the cluster resources of a primary node when the primary node becomes unavailable. A primary node in a failover cluster may become unavailable when it is down or unreachable due to, for example, hardware, software, or communication failures.

In some embodiments, a migration event may be triggered when a primary node becomes unavailable. During a migration event, resource groups that were previously available on the primary node may be migrated (e.g., failover or moved) to a standby node. One or more standby nodes may serve as a migration target for a primary node during a migration event. A given standby node, however, may have a reduced resource capacity compared to the primary nodes. Consequently, there may be scenarios where a standby node does not have capacity to concurrently load or execute all resource groups of an unavailable primary node. The inability of a standby node to load or execute all the resource groups of a primary node may result in interruptions or delays in the availability of services provided by a primary node prior to the migration event.

Embodiments of the present disclosure are directed to an architecture for automatically determining a serial order for starting up resource groups on standby node during a migration event. The serial order may be determined by a priority associated with each resource group. The priority associated with a resource group may be based on a prediction of the likelihood that the resource group will be in use (e.g., one or more client applications may be using the services of the resource group) at a time after a migration event. Resource groups that have a greater likelihood of being in use after the migration event may be started earlier (e.g., given higher priority) in the serial order. The priority of a resource group in the serial order can be determined by monitoring the resource usage of each application in the resource group prior to the migration event (e.g., at a first time). A resource usage model may then be generated based on the history of resource usage. The resource usage model may in turn be used to predict (or extrapolate) a resource usage score for a resource group at a time after the migration event (e.g., at a second time). The resource usage score may correspond to a likelihood of the resource group being in use at a time after the failover event.

As used herein, a resource may be an application (hereinafter, resource application) executing on a node of a failover cluster. A resource may provide a service to components of a failover cluster (e.g., another application), or to an entity external to the failover cluster (e.g., a client computing node or software application). A resource group may be a set of related resource applications that are referenced or managed as a single logical entity. During a migration event, all applications in a resource group may be moved to a standby node and started as a single entity. System resources may be a hardware resources of a node. System resources may additionally include resource applications.

Figure 1:
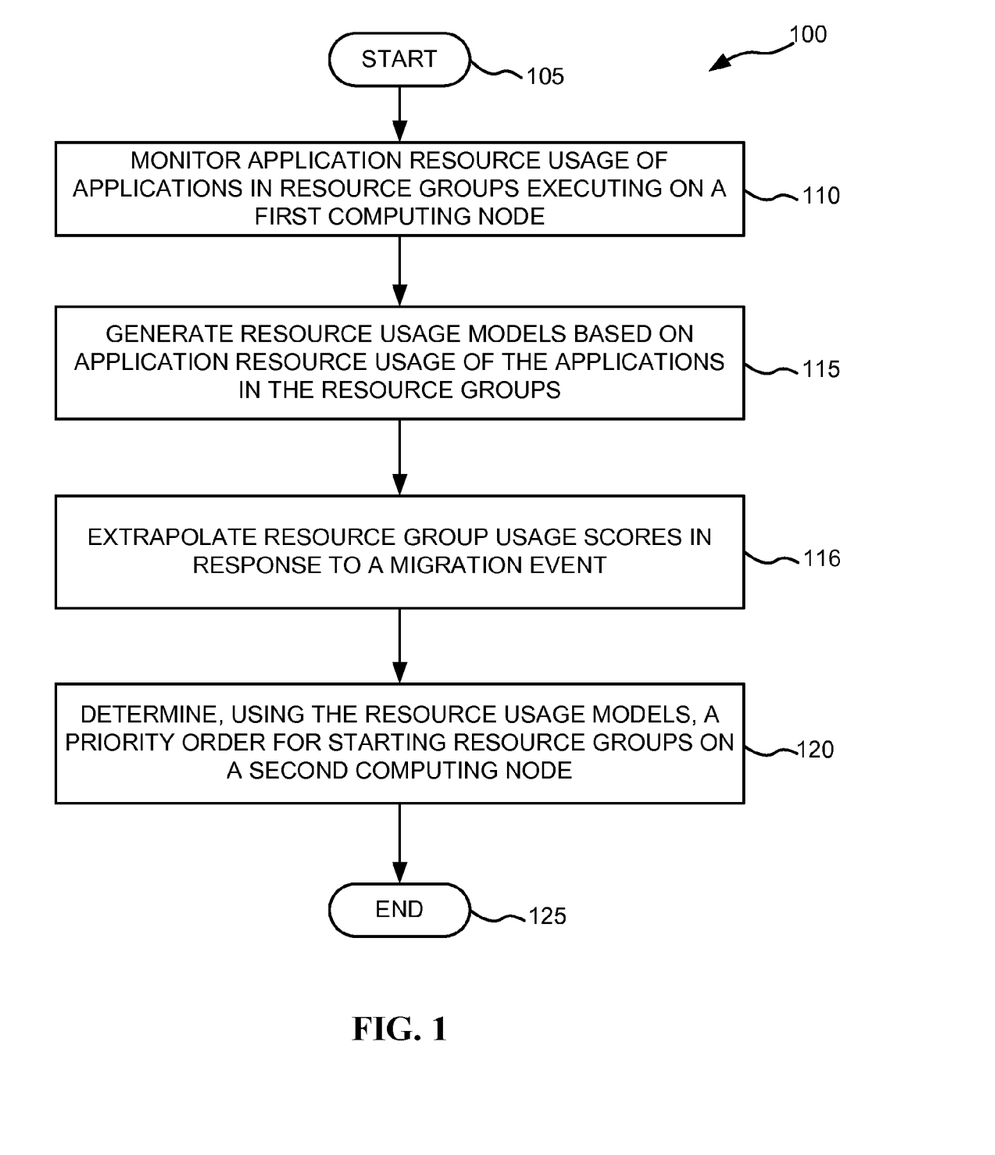
FIG. 1 depicts a flowchart of operations for automatically prioritizing startup of resource groups during a migration event, according to various embodiments.

Referring now to the figures, FIG. 1 depicts a flowchart 100 of operations for automatically prioritizing startup of resource groups during a migration event, according to various embodiments. The operations of the flowchart 100 may be performed by a cluster computing management application (hereinafter, management application) of a failover cluster system (or other cluster system). The management application may include one or more components executing on one or more computing nodes of the failover cluster. The one or more computing nodes may include a first node (e.g., a primary node) having a plurality of resource groups providing services on behalf of the failover cluster. The one or more computing nodes may additionally include a second node (e.g., a redundant or standby node) serving as migration target for the first node during a migration event. In certain embodiments the management application execute on a third node (e.g., a cluster manager node). Each node may be a single computing device or a plurality for computing devices, such as computing device 400 of FIG. 4.

The management application may begin the operations of flowchart 100 by executing operation 105. Executing operation 105 may generally include starting resource groups on the first node, and establishing/exchanging communication protocols between the first node and the second node. Components of the management application executing on the second node may monitor the first node to determine when the first node becomes unavailable. Monitoring the first node may include periodically receiving a heartbeat communication from the first node. In some embodiments, operation 105 may further include establishing a data repository that is accessible to at least the first and second nodes.

A component of the cluster management application executing on the first node may execute operation 110 by monitoring (e.g., measuring) the system resource usage of resource applications in resource groups executing on the first node. A resource application may utilize the system resources of the first node during the course of the resource application's execution to support services (e.g., data processing, and file management) provided by the first node. System resources utilized by a resource application may include, for example, processing power, physical memory, persistent storage, network bandwidth, or services provided by other resource applications executing on the node. One or more resource monitor software applications or scripts executing on the first node may monitor each system resource of the first node and provide an output (e.g., a resource utilization value) indicating an amount of each resource that a resource application uses.

The management application may monitor the system resource usage of an application executing on the first node by receiving and/or storing the output of the resource monitoring software applications. In certain embodiments, the management application may periodically (e.g., every 60 seconds while the first node is running) receive and/or store the output of the resource monitoring software applications. In some embodiments, the management application may receive or store an output of the resource monitoring software applications in a memory or persistent storage area of the first node. In other embodiments, the management application may store an output of the resource monitoring software applications in a data repository accessible to at least the first and second nodes.

The management application may execute operation 115 by generating resource usage models based on system resource usage of the resource applications in each resource group executing on the first node. A resource usage model may be a mathematical function expressing a relationship between the resource utilization values of a set of resource applications (e.g., a resource group) with respect to time. In some embodiments, a resource usage model may be generated for a single resource application (e.g., a resource group having one application). In other embodiments, a resource usage score may be generated for a plurality of resource applications in a resource group.

A component of the management application executing on the first node may periodically generate and/or update the resource usage models. The management application may then make the model accessible to the second node by, for example, storing the models in a data repository accessible by the second node. In other embodiments, a component of the management application executing on the second node (or a third management node) may generate the resource usage models in response to the first node becoming unavailable.

Generating a resource usage model may include calculating, based on system resource usage, a resource usage score for each resource application in a resource group. A weighted mathematical expression may be used to combine the resource utilization values of each system resource used by resource application into a single numeric value. The resource usage score of an application may be a numeric value produced by the weighted mathematical expression. In certain embodiments, the weighted mathematical expression may be linear expression combining (e.g., using numerical addition) the weighted resource utilization values. An example linear expression would be:

$$RGscore = r1*cpu\_util + r2*mem\_util + r3*diskIO\_util + r4*NetworkIO\_util$$

The term RGscore is the resource usage score of a resource application. The variables cpu_util, mem_util, diskIO_util, and networkIO_util may be the respective processor, memory, storage and network resource utilization values associated with a resource application. The variables r1, r2, r3, and r4 represent weights associated with each system resource.

Referring still previous mathematical expression for determining resource usage score, the variables cpu_util, mem_util, diskIO_util, and networkIO_util may be replaced by appropriate numeric values representing the system resource utilization of an application when calculating a resource usage score of the application. For example, cpu_util may be replaced by a resource utilization value representing data packets processed for an application or the percentage of time a processor spent performing work for a resource application. The mem_util term may be replaced by a resource utilization value indicating the number data packets written to, or read from, the memory of a node on the behalf of a resource application. Similarly, diskIO_util may be replaced by a number of data packets written to or read from storage, while network_util may be replaced by a number of data packets traversing a network interface on the behalf of a resource application. In some embodiments, a resource utilization value may be provided as a percentage utilization (e.g., forty-percent of the operations performed by a CPU during a given unit of time were processed on the behalf of a given application). In other embodiments, a resource utilization value may be provided as an absolute value (e.g. a numeric value having a unit). For example, a network interface of a node processed 500 packets on behalf of an application during a given unit of time.

When a resource utilization value is provided as absolute value, the resource utilization value may be normalized within a given time period. Normalization may include scaling an amount of resource utilization within a given time period (e.g., a number of packets processed per time period) by a normalization factor determined according to a maximum possible utilization rate of a given resource. In some embodiments, normalization may scale a resource utilization metric given in an absolute value to a percentage of the maximum possible utilization rate of a given resource. For example, a given network interface adaptor may be able to process 1000 packets per second (e.g., maximum possible utilization rate of 1000 packets per second), while a resource application may cause 250 packets to be processed by the network interface per second. The 250 packet per second resource utilization value may be normalized to a 25% utilization rate.

In some embodiments, the normalization factors used to normalize resource utilization values of each system resource used by a resource application may be distinct. A first normalization factor, for example, may be applied to the processor utilization value of an application, while a second normalization factor may be applied to memory utilization value of the same resource application. In certain embodiments, a normalization factor used to normalize a resource utilization value for a given resource may be the same between resource applications. The same normalization factor, for example, may be used to normalize a processor usage of both a first and a second resource application.

Referring again to the expression for determining resource utilization score, the weights r1-r4 may be selected to indicate how each resource utilized in the expression should be weighted. Stated another way, the weights r1-r4 represent an importance of each resource in the determination of a resource utilization score. In some embodiments, weights r1-r4 may be numeric constants provided, for example, by a systems administrator of a failover cluster. In particular embodiments the weights r1-r4 may be determined by one or more variables, including, for example, the time of day or the type of resource application for which a resource utilization score is being calculated. In various embodiments, the weights r1-r4 may be unique for each expression determining the resource usage score of each resource application in a resource group.

Generating a resource usage model according to operation 115 may further include combining the resource usage scores of each resource application in a resource group to form a resource group usage score. The resource usage scores may be combined by numerically adding the resource score of each application together. The resource usage scores may also be combined according to other appropriate mathematical operations, including, for example, combining the resource usage scores using linear weighted expressions.

Generating a resource usage model may additionally include storing the resource group usage score in a database to create a usage score history. In embodiments where system resource usage is monitored periodically, a resource group usage score can be calculated by a management application and stored each time the management application samples or receives resource utilization values from the resource monitoring applications. The resource group usage scores or usage score history may be stored in data repository accessible to at least the first and second node, as described herein.

Generating a resource usage model may also include generating a resource usage model for each resource group based on respective resource group usage score histories. The resource usage model may be a stochastic mathematical function having resource group usage score as a dependent variable and time as an independent variable. The management application may generate a resource usage model for a given resource group using one or more mathematical curve fitting applications. The curve fitting applications may generate a mathematical function fitting the values of the resource usage history for the resource group with respect to time. The management application may generate a plurality of mathematical functions and select the function which best predicts the values of the resource usage history as the resource usage model.

The management application may execute operation 116 by extrapolating resource group usage scores for each resource group in response to a migration event. The management application may extrapolate resource usage scores for each resource group using the respective resource usage models for each resource group to predict (e.g., estimate) what the resource group usage score of each resource group would be at the time of the migration event if the migration event had not occurred (e.g., if first node was still available).

The management application may execute operation 120 by determining a priority order for starting resource groups on the second node during a migration event. The management application may determine the priority order by first generating an ordered list or table of the extrapolated resource group usage scores. The management application may then determine the priority order by according to the magnitude of the extrapolated resource group usage scores. For example, resource groups having a larger resource group usage score may be ordered higher (e.g., indicating that the resources may be started earlier) in the priority order than resource groups having small resource usage scores.

In some embodiments, a priority order may be determined according to additional considerations. For example, the priority order may be partially determined by a hierarchical relationship between resource groups, with a resource group appearing earlier in the hierarchy being ordered higher in the priority order than a resource group appearing lower in the hierarchy. For example, a first resource group that is the parent of a second resource group (e.g., the execution of resource applications of the second resource group is dependent on the availability of the resource applications of the first resource group), may have a higher priority than the second resource group. The first resource group may have a higher priority than the second resource group even when the predicted resource group usage score of the first resource group is lower than the predicted resource group usage score of the second resource group.

In some embodiments, resource usage models may be generated for each resource application within a resource group (e.g., based on a resource usage history of the resource application). The resource usage model of a resource application may then be used to determine a priority order for starting individual applications within a given resource group in a similar way to determining the priority order for starting resource groups.

The management application may perform operation 125 by loading resource groups on the second node according to the priority order.

Figure 2:
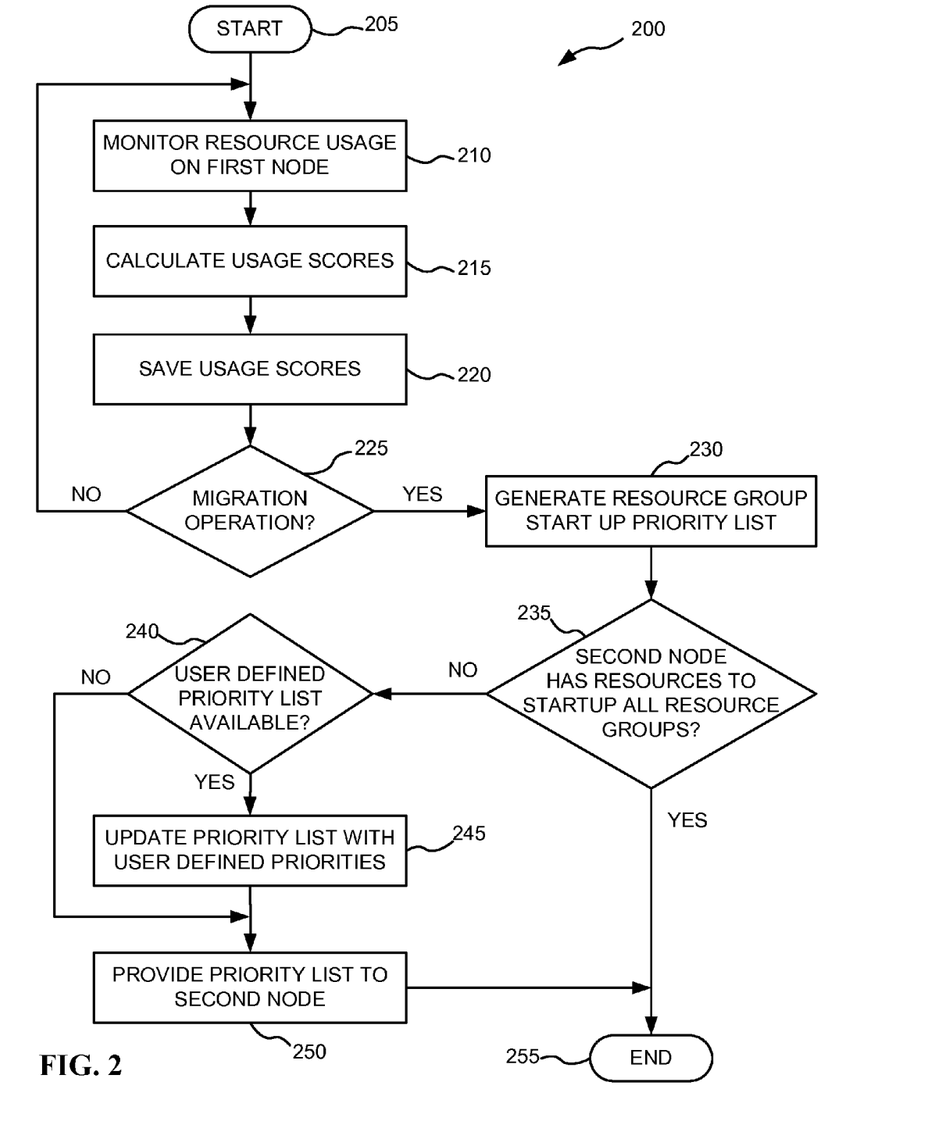
FIG. 2 depicts a second flowchart of operations for automatically prioritizing startup of resource groups during a migration event, according to various embodiments.

FIG. 2 depicts a second flowchart 200 of operations for automatically prioritizing startup of resource groups during a migration event, according to various embodiments. The operations of the flowchart 200 may be performed by a cluster computing management application having components executing on one or more computing nodes of a failover cluster. For example, a first components of the management application may execute on a first node having resource groups which provide services on behalf of the failover cluster. Additionally, a second component of the management application may execute on a second node serving as a migration target for resource groups being moved from the first node during a migration event. In some embodiments, components of the management application may execute on a third node (e.g., a cluster management node). Each node may be a single computing device or a plurality for computing devices, such as computing device 400 of FIG. 4.

The cluster computing management application may begin the operations of flowchart 200 by executing operation 205. Executing operation 205 may include substantially the same operations as described for the execution of operation 105 of the flowchart 100.

The management application may proceed through flowchart 200 by executing operation 210. The first component of the management application may execute operation 210 on behalf of the management application by monitoring resource usage of resource applications executing on the first node, as described in the discussion of operation 110 of FIG. 1.

The management application may continue through flowchart 200 by executing operation 215. The first component of the management application may execute operation 215 on behalf of the management application by calculating resource usage scores of resource applications and resource groups executing on the first node, as described in the discussion of operation 115 of FIG. 1.

The management application may proceed through the flowchart 200 by executing operation 220. The first component of the management application may execute operation 220 on behalf of the management application by storing the resource usage scores calculated in operation 215 in a resource usage history database, as described in the discussion of operation 115 of FIG. 1.

The management application may then continue flowchart 200 by executing operation 225. The second component of the management application (or a component of the management application executing on a third node) may execute operation 225 by determining whether to execute a migration operation. In some embodiments, the management application may decide to execute a migration operation in response losing communication with the first node (e.g., a threshold period of time may have elapsed since the second node received a heartbeat communication from the first node). In certain embodiments, the management application may decide to execute a migration operation in response to determining that the first node is not able to provide the services of one or more resources applications on behalf of the computing cluster. In other embodiment, the management application may decide to execute a migration operation in response other established migration criteria. The management application may return to operation 210 in response to deciding not to execute a migration operation. Complementarily, the management application may proceed to operation 230 in response to deciding to execute a migration operation.

The management application may execute operation 230 by generating a resource group start up priority list. The resource group priority list may be a list or table indicating a priority order for starting up resource groups on the second node. The priority order may be determined as described in the discussion operation 120 of FIG. 1. The priority list may be stored in a data repository accessible to at least the second node, as described herein.

The management application may continue through the flowchart 200 by executing operation 235. Executing operation 235 may include determining whether the second node has sufficient available system resources to startup all the resource groups being migrated from the first node. The second node may have sufficient system resource to start all the resource groups being migrated if each resource group can be started substantially in parallel without causing a delay (e.g., as determined by a client application or a systems administrator) in the availability of services provided by the any of the resource groups. In some embodiments, the management application may determine whether the second node has sufficient resources by comparing a database of system resources (e.g., a resource catalog) of the first node to a database of system resources of the second node. The database of system resources may be stored in data repository accessible at least the second node. In other embodiments, the management application may determine whether the second node has sufficient resources according to other criteria established, for example, by a systems administrator.

The management application may proceed to operation 255 in response to determining that the second node has sufficient resources to startup all resource groups being migrated. Complementarily, the management application may proceed to operation 240 in response to determining that the second node does not have sufficient resources to startup resource groups being migrated.

The management application may execute operation 240 by determining whether there is a user defined priorities list available for determining the priority order for starting up resource groups on the second node. A user defined priorities list may be provided by a systems administrator and stored in a data repository. The user defined priorities list may provide a resource group criteria or priority that may supplement or replace the priority order for resource group startup included in the list generated in operation 230. The management application may proceed to operation 245 in response to determining that a user defined priorities list is available. Alternatively, the management application may proceed to operation 250 in response to determining that a user defined priorities list is not available.

The management application may execute operation 245 by updating the priority list generated in operation 230 with the user defined priority list. Updating the priority list generated in operation 230 may include modifying the priority order included in the list to correspond with a criteria or priority order determined by the user defined priority list.

The management application may execute operation 250 by providing either the priority list generated in operation 230 or the updated priority list generated in operation 245 to the second node. Providing the priority list to the second node may include storing the list in a data repository accessible to at least the second node. Providing the priority list to the second node may additionally include transmitting the list to the second node over a data communications network.

The management script may execute operation 255 by loading (e.g., starting) resource groups on the second node according to the priority list.

Figure 3:
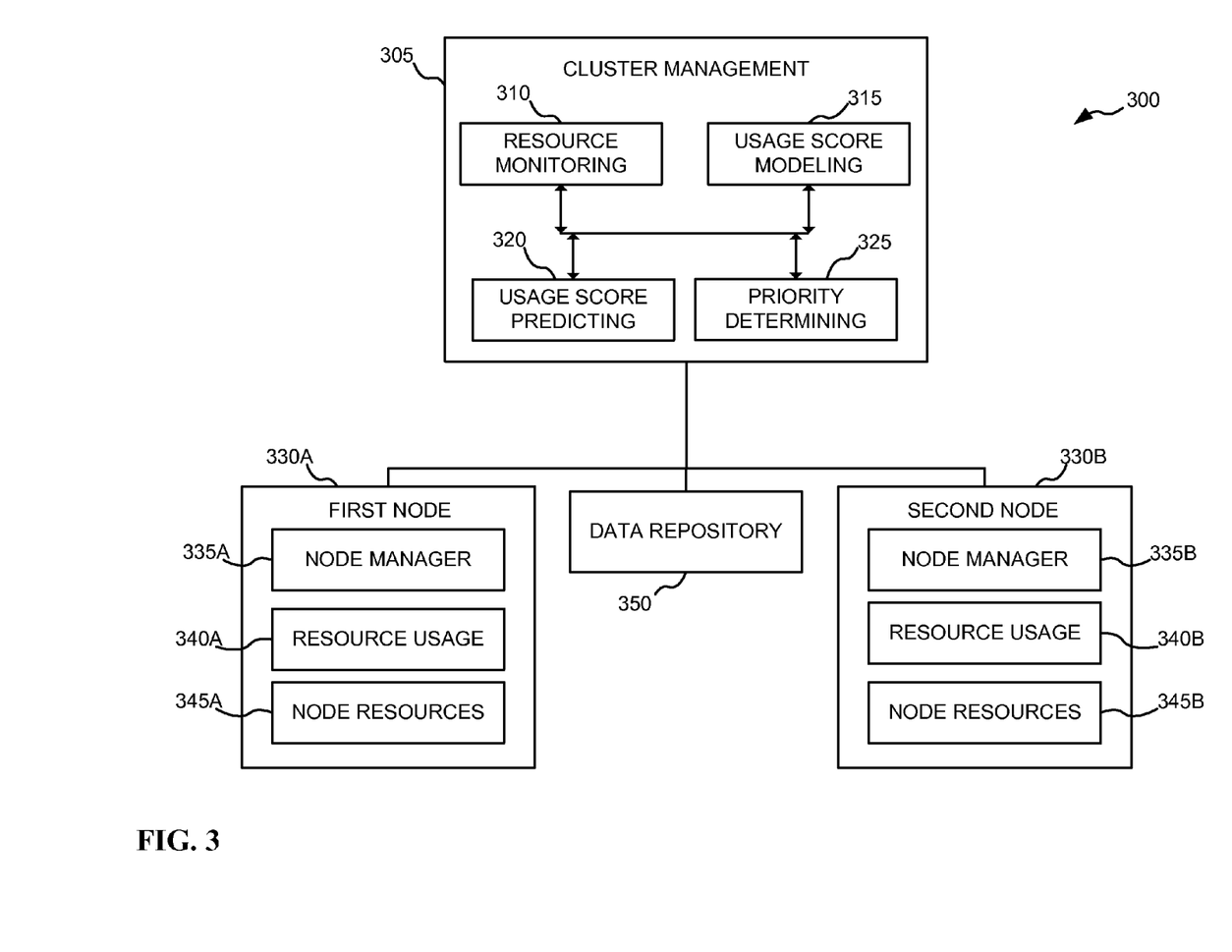
FIG. 3 depicts a block diagram of an embodiment of a failover cluster configured to implement an architecture for automatically prioritizing startup of resource groups during a migration event.

FIG. 3 depicts a block diagram of an embodiment of a computing cluster 300 configured to implement an architecture for automatically prioritizing startup of resource groups during a migration event. The computing cluster 300 may include cluster management module 305, a first node 330A, a second node 330B, and a data repository 350.

The cluster management module 305 may be a cluster computing software application having components which may execute on one or more computing nodes. The cluster management module 305 may include a resource monitoring component 310, a usage score modeling component 315, a usage score predicting component 320, and a priority determining component 325. The cluster management module 305 may include software applications and scripts having computer readable instructions for managing the operations of each component of the cluster management module, and for executing the operations described herein. Each component of the cluster management module 305 may include software applications and/or hardware for performing at function of the component. A first component of the cluster management module 305 may exchange data with a second component of the cluster management module or an application executing on a node (e.g., the first or second nodes) of the computing cluster 300 via inter-process communications (e.g., via software sockets), a data communications network, or by accessing data repository 350.

The resource monitoring component 310 may monitor the system resource usage of resource applications executing on a first node (e.g., a primary node) of a failover cluster, as described herein. The resource monitoring component 310 may periodically receive resource utilization values from one or more resource monitoring applications or utilities executing on at least the first node. The resource monitoring component 310 may provide the resource utilization values to the cluster management module 305, as described herein.

The usage score modeling component 315 may include one or more software applications for generating resource usage models for one or more resource groups, as described herein. The usage score modeling component 315 may, for example, include a database management/interfacing applications for storing a history of resource group usage scores in persistent storage. The usage score modeling component 315 may additionally include mathematical curve fitting applications for generating a mathematical model (or function) corresponding to the behavior of the resource group usage scores of a given resource group over time. The usage score modeling component 315 may provide the resource usage model to the cluster management module, as described herein.

The usage score predicting component 320 may include one or more software applications for determining, based on a resource usage model generated by usage score modeling component 315, a resource group usage score at a time for which usage scores are not available (e.g., at time after the first node becomes unavailable). The usage predicting component 320 may provide the predicted resource group usage score to the cluster management module, as described herein.

The priority determining module 325 may receive predicted resource group usage scores from the cluster management module 305 and generate a priority order for starting resource groups on the second node in response to a migration event. The priority determining module 325 may provide the priority order to the cluster management module 305 using methods described herein.

The first node 330A may be a primary node of a failover cluster 300. The first node 330A may be a single computing device or a plurality for computing devices, such as computing device 400 of FIG. 4. The first node 330A may have one or more resource groups executing on the first node to provide services of the failover cluster 300. The first node 330A may include a node manager component 335A, resource usage component 340A, and node resources 345A. A first component of the first node 330A may exchange data with a second component of the first node via inter-process communications (e.g., via software sockets), a data communications network, or by accessing data repository 350.

The node manager 335A may include software applications and scripts having computer readable instructions for managing the operations of each component of the first node 330A, and for executing the operations described herein. The node manager 335A may further include, and manage the execution of, one or more components of the cluster management module 305.

The resource usage component 340A may include software applications for monitoring system resource usage as described, herein. The resource usage component 340A may be configured to periodically provide resource utilization values to a component of the cluster management module 305, as described herein.

The node resources 345A may include one or more resources available to resource applications executing on the first node 330A. The node resources 345A may include system resources such as a processor, system memory, persistent storage, and a network communication interface. The node resources 345A may additionally include software resources provided by resource groups, including, for example, databases, server applications, and data processing applications.

The second computing node 330B may be a redundant or standby node of the failover cluster 300. The second node 330B may be a single computing device or a plurality for computing devices, such as computing device 400 of FIG. 4. The second node 330B may include a node manager component 335B, resource usage component 340B, and node resources 345B. The components of the second node 330B may be analogous to corresponding components of the first node 330A. The quantity of node resources 345A may be different from the quantity of node resources 345B (e.g., the first node may have more system memory than the second node). Additionally, node manager 335B may include different components of the cluster management module 305 than the node manage 335A (e.g., the usage predicting component 320 may be present in node manager 335B, but absent in node manager 335A). A first component of the second node 330B may exchange data with a second component of the second node via inter-process communications, a data communications network, or by accessing data repository 350.

Data repository 350 may be a file storage system managed by one or more nodes of the computing cluster 300. The data repository 350 may include one or more persistent storage devices (e.g., disk drives). Additionally, data repository 350 may include software applications for providing file access services to the failover cluster 300. Data repository 350 may exchange data between the components of the failover cluster 300 via inter-process communications, a data communications network.

Figure 4:
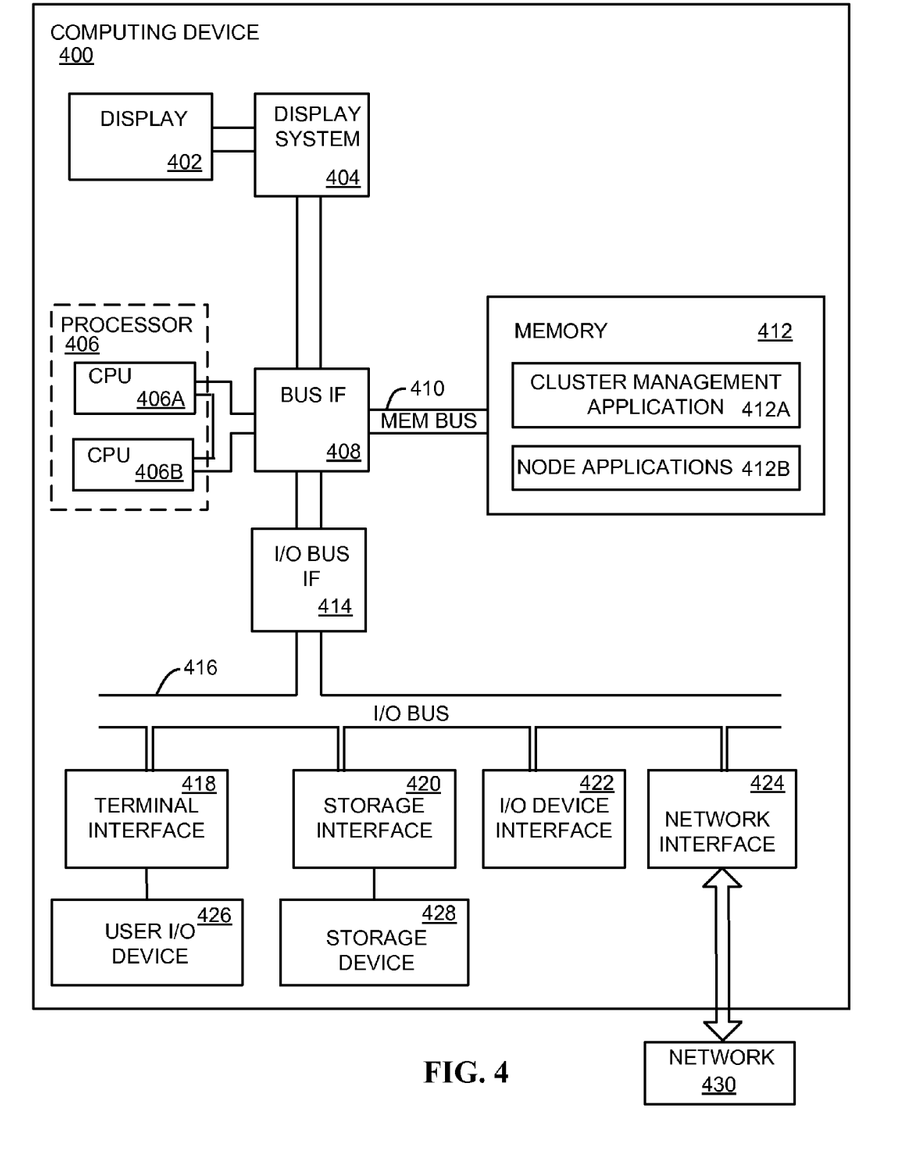
FIG. 4 is a block diagram illustrating an embodiment of a node device that includes a memory and processor for implementing and executing an architecture for automatically prioritizing startup of resource groups during a migration event.

FIG. 4 is a block diagram illustrating an embodiment of a node/computing device 400 that includes a memory and processor for implementing and executing the architecture for automatically prioritizing startup of resource groups during a migration event. The components of the computing device 400 can include one or more processors 406, a memory 412, a terminal interface 418, a storage interface 420, an Input/Output ("I/O") device interface 422, and a network interface 424, all of which are communicatively coupled, directly or indirectly, for inter-component communication via a memory bus 410, an I/O bus 416, bus interface unit ("IF") 408, and an I/O bus interface unit 414.

The computing device 400 may include one or more general-purpose programmable central processing units (CPUs) 406A and 406B, herein generically referred to as the processor 406. In certain embodiments, a processor may be any electronic device having a datapath for executing a sequence of programmed instructions and capable of performing arithmetic logic computations (e.g., using an arithmetic logic unit), include application specific integrated circuits, and field programmable gate arrays. In an embodiment, the computing device 400 may contain multiple processors; however, in another embodiment, the computing device 400 may alternatively be a single CPU device. Each processor 406 executes instructions stored in the memory 412.

The computing device 400 may include a bus interface unit 408 to handle communications among the processor 406, the memory 412, the display system 404, and the I/O bus interface unit 414. The I/O bus interface unit 414 may be coupled with the I/O bus 416 for transferring data to and from the various I/O units. The I/O bus interface unit 414 may communicate with multiple I/O interface units 418, 420, 422, and 424, which are also known as I/O processors (IOPs) or I/O adapters (IOAs), through the I/O bus 416. The display system 404 may include a display controller, a display memory, or both. The display controller may provide video, audio, or both types of data to a display device 402. The display memory may be a dedicated memory for buffering video data. The display system 404 may be coupled with a display device 402, such as a standalone display screen, computer monitor, television, a tablet or handheld device display, or another other displayable device. In an embodiment, the display device 102 may include one or more speakers for rendering audio. Alternatively, one or more speakers for rendering audio may be coupled with an I/O interface unit. In alternate embodiments, one or more functions provided by the display system 404 may be on board an integrated circuit that also includes the processor 406. In addition, one or more of the functions provided by the bus interface unit 408 may be on board an integrated circuit that also includes the processor 406.

The I/O interface units support communication with a variety of storage and I/O devices. For example, the terminal interface unit 418 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 426 and the computing device 400, may receive output data via the user output devices. For example, a user interface may be presented via the user I/O device 426, such as displayed on a display device, played via a speaker, or printed via a printer.

The storage interface 420 supports the attachment of one or more disk drives or direct access storage devices 428 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 428 may be implemented via any type of secondary storage device. The contents of the memory 412, or any portion thereof, may be stored to and retrieved from the storage device 428 as needed. The I/O device interface 422 provides an interface to any of various other I/O devices or devices of other types, such as printers or fax machines. The network interface 424 provides one or more communication paths from the computing device 400 to other digital devices and computer systems.

Although the computing device 400 shown in FIG. 4 illustrates a particular bus structure providing a direct communication path among the processors 406, the memory 412, the bus interface 408, the display system 404, and the I/O bus interface unit 414, in alternative embodiments the computing device 400 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 414 and the I/O bus 408 are shown as single respective units, the computing device 400, may include multiple I/O bus interface units 414 and/or multiple I/O buses 416. While multiple I/O interface units are shown, which separate the I/O bus 416 from various communication paths running to the various I/O devices, in other embodiments, some or all of the I/O devices are connected directly to one or more system I/O buses.

In various embodiments, the computing device 400 is a multi-user mainframe computer system, a single-user system, or a server computer or similar device that has little or no direct user interface, but receives requests from other computer systems (clients). In other embodiments, the computing device 400 may be implemented as a desktop computer, portable computer, laptop or notebook computer, tablet computer, pocket computer, telephone, smart phone, or any other suitable type of electronic device.

In an embodiment, the memory 412 may include a random-access semiconductor memory, storage device, or storage medium (either volatile or non-volatile) for storing or encoding data and programs. In another embodiment, the memory 412 represents the entire virtual memory of the computing device 400, and may also include the virtual memory of other computer systems coupled to the computing device 400 or connected via a network 430. The memory 412 may be a single monolithic entity, but in other embodiments the memory 412 may include a hierarchy of caches and other memory devices. For example, memory may exist in multiple levels of caches, and these caches may be further divided by function, so that one cache holds instructions while another holds non-instruction data, which is used by the processor. Memory 412 may be further distributed and associated with different CPUs or sets of CPUs, as is known in any various so-called non-uniform memory access (NUMA) computer architectures.

The memory 412 may store all or a portion of the components and data shown in FIG. 1-3. In particular, the memory 412 may store cluster management application 412A, and node applications 412B along with other modules, scripts and library components used to implement the operations of the present disclosure. The cluster management application 412A may include one or more applications configured to execute the operations of components of the cluster manager module 305, as described herein. The node applications 412B may include scripts and applications for facilitating the operation of a primary or a redundant node, as described herein. These programs and data structures are illustrated in FIG. 1-3 as being included within the memory 412 in the computing device 400; however, in other embodiments, some or all of them may be on different computer systems and may be accessed remotely, e.g., via a network 430. The computing device 400 may use virtual addressing mechanisms that allow the programs of the computing device 400 to behave as if they only have access to a large, single storage entity instead of access to multiple, smaller storage entities. Thus, while the components and data shown in FIG. 1-3 are illustrated as being included within the memory 412, these components and data are not necessarily all completely contained in the same storage device at the same time. Although the components and data shown in FIG. 1-3 are illustrated as being separate entities, in other embodiments some of them, portions of some of them, or all of them may be packaged together.

In an embodiment, the components and data shown in FIG. 1-3 may include instructions or statements that execute on the processor 406 or instructions or statements that are interpreted by instructions or statements that execute on the processor 406 to carry out the functions as further described below. In another embodiment, the components shown in FIG. 1-3 may be implemented in hardware via semiconductor devices, chips, logical gates, circuits, circuit cards, and/or other physical hardware devices in lieu of, or in addition to, a processor-based system. In an embodiment, the components shown in FIG. 1-3 may include data in addition to instructions or statements.

FIG. 4 is intended to depict representative components of the computing device 400. Individual components, however, may have greater complexity than represented in FIG. 4. In FIG. 4, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 4 may be implemented, in various embodiments, in a number of different ways, including using various computer applications, routines, components, programs, objects, modules, data structures etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer system, comprising:
one or more computing nodes having a memory and a processor; and
a computer readable non-transitory storage medium of the one or more computing nodes having program instructions embodied therewith, the program instructions executable by the processor to cause the computer system to:
  monitor system resource usage of a first set of applications in a first resource group of a set of at least two resource groups executing on a first computing node at a first time,
    wherein each resource group of the set of at least two resource groups includes one or more related applications that execute on the first computing node and utilize system resources of the first computing node;
  monitor system resource usage of a second set of applications in a second resource group of the set of at least two resource groups executing on the first computing node at the first time;
  generate, based on the monitored system resource usage of the first set of applications, a first resource usage model, wherein the first resource usage model comprises, for each application in the first set of applications, a first resource usage score which aggregates monitored system resource usage of two or more system resources used by the each application in the first set of applications;
  generate, based on the monitored resource usage of the second set of applications, a second resource usage model, wherein the second resource usage model comprises, for each application in the second set of applications, a second resource usage score which aggregates monitored system resource usage of two or more system resources used by the each application in the second set of applications;
  generate, based on the first resource usage model and in response to an occurrence of a migration event, a first resource group usage score for the first resource group, wherein,
    the migration event is an event requiring each resource group of the set of at least two resource groups to be moved from executing on the first computing node to executing on a second computing node, and
    the first resource group usage score is a prediction of aggregate system resource usage of applications in the first resource group subsequent to the occurrence of the migration event;
  generate, based on the second resource usage model and in response to the occurrence of the migration event, a second resource group usage score for the second resource group, wherein the second resource group usage score is a prediction of aggregate system resource usage of applications in the second resource group subsequent to the occurrence of the migration event;
  determine, based on at least the first resource group usage score and second resource group usage score, that the first resource group is predicted to have greater likelihood of being in use after the migration event than the second resource group; and serially load, in response to the determination, the first resource group on the second computing node before the second resource group.

2. The computer system of claim 1, wherein the program instructions executable by the processor further cause the computer system to:

determine, based on the monitored system resource usage of the first set of applications, a resource usage score for a first application of the first set of applications by executing operations to determine a first resource usage value that indicates a quantity of a first system resource used by the first application, determine a second resource usage value that indicates quantity of a second system resource used by the first application, determine a first weight and a second weight to additively combine, respectively, the first resource usage value and the second resource usage value in a first mathematical expression, wherein the first weight and the second weight respectively indicate a relative importance, with respect to all system resources used by the first application, of the first system resource and the second system resource for determining the resource usage score for the first application, and evaluate the first mathematical expression to determine the resource usage score for the first application.

3. The computer system of claim 2, wherein the program instructions executable by the processor further cause the computer system to:

store, for each application in the first set of applications, the first resource usage score in a usage score history in a non-transient memory of a third computing node; and generate the first resource usage model using the usage score history.

4. The computer system of claim 2, wherein the program instructions executable by the processor further cause the computer system to:

determine, based on the monitored system resource usage of the first set of applications, a resource usage score for a second application of the first set of applications by executing operations to determine a third resource usage value that indicates a quantity of a third system resource used by the second application, determine a fourth resource usage value that indicates quantity of a fourth system resource used by the second application, determine a third weight and a fourth weight to additively combine, respectively, the third resource usage value and the fourth resource usage value in a second mathematical expression, wherein the third weight and the fourth weight respectively indicate a relative importance, with respect to all system resources used by the second application, of the third system resource and the fourth system resource for determining the resource usage score for the second application, and evaluate the second mathematical expression to determine the resource usage score for the second application;

determine a fifth weight and a sixth weight to additively combine, respectively, the resource usage score for the first application and the resource usage score for the second application in a third mathematical expression, wherein the fifth weight and the sixth weight respectively indicate a relative importance, with respect to all applications in the first set of applications, of the first application and the second application to determining the first resource group usage score; and evaluate the third mathematical expression to determine the first resource group usage score.

5. The computer system of claim 1, wherein the program instructions executable by the processor further cause the computer system to monitor system resource usage of the first set of applications by executing operations to measure at least one of central processor usage, memory utilization, storage utilization, and network utilization.

6. The computer system of claim 1, wherein the program instructions executable by the processor further cause the computer system to:

serially load the first resource group by executing operations to execute each application in the first set of applications on the second computing node.

7. A computer program product including a computer readable storage medium having program instructions embodied therewith, wherein the computer readable storage medium is not a transitory signal, the program instructions executable by a processing circuit to cause the processing circuit to perform a method comprising:

monitoring system resource usage of a first set of applications in a first resource group of a set of at least two resource groups executing on a first computing node at a first time, wherein each resource group of the set of at least two resource groups includes one or more related applications that execute on the first computing node and utilize system resources of the first computing node;

monitoring system resource usage of a second set of applications in a second resource group of the set of at least two resource groups executing on the first computing node at the first time;

generating, based on the monitored system resource usage of the first set of applications, a first resource usage model, wherein the first resource usage model comprises, for each application in the first set of applications, a first resource usage score which aggregates monitored system resource usage of two or more system resources used by the each application in the first set of applications;

generating, based on the monitored system resource usage of the second set of applications, a second resource usage model, wherein the second resource usage model comprises, for each application in the second set of applications, a second resource usage score which aggregates monitored system resource usage of two or more system resources used by the each application in the second set of applications;

generating, based on the first resource usage model and in response to an occurrence of a migration event, a first resource group usage score for the first resource group, wherein, the migration event is an event requiring each resource group of the set of at least two resource groups to be moved from executing on the first computing node to executing on a second computing node, and the first resource group usage score is a prediction of aggregate system resource usage of applications in the first resource group subsequent to the occurrence of the migration event;

generating, based on the second resource usage model and in response to the occurrence of the migration event, a second resource group usage score for the second resource group, wherein the second resource group usage score is a prediction of aggregate resource usage of applications in the second resource group subsequent to the occurrence of the migration event;

determining, based on at least the first resource group usage score and second resource group usage score, that the first resource group is predicted to have a greater likelihood of being in use after the migration event than the second resource group; and serially loading, in response to the determination, the first resource group on the second computing node before the second resource group.

8. The computer program product of claim 7, wherein the method further comprises generating a resource usage score for a first application of the set of applications by:

determining a first resource usage value that indicates a quantity of a first system resource used by the first application, determining a second resource usage value that indicates quantity of a second system resource used by the first application, determining a first weight and a second weight to additively combine, respectively, the first resource usage value and the second resource usage value in a first mathematical expression, wherein the first weight and the second weight respectively indicate a relative importance, with respect to all system resources used by the first application, of the first system resource and the second system resource to determine the resource usage score for the first application, and evaluating the first mathematical expression for determining the resource usage score for the first application.

9. The computer program product of claim 8, wherein the method further comprises:

storing, for each application in the first set of applications, the first resource usage score in a usage score history in a non-transient memory of a third computing node; and generating the first resource usage model using the usage score history.

10. The computer program product of claim 8, wherein the method further comprises:

determining, based on the monitored system resource usage of the first set of applications, a resource usage score for a second application of the first set of applications by determining a third resource usage value that indicates a quantity of a third system resource used by the second application, determining a fourth resource usage value that indicates quantity of a fourth system resource used by the second application, determining a third weight and a fourth weight to additively combine, respectively, the third resource usage value and the fourth resource usage value in a second mathematical expression, wherein the third weight and the fourth weight respectively indicate a relative importance, with respect to all system resources used by the second application, of the third system resource and the fourth system resource for determining the resource usage score for the second application, and evaluating the second mathematical expression to determine the resource usage score for the second application;

determining a fifth weight and a sixth weight to additively combine, respectively, the resource usage score for the first application and the resource usage score for the second application in a third mathematical expression, wherein the fifth weight and the sixth weight respectively indicate a relative importance, with respect to all applications in the first set of applications, of the first application and the second application to determining the first resource group usage score; and evaluating the third mathematical expression to determine the first resource group usage score.

\* \* \* \* \*